May 24, 1932.  J. E. HORSTE  1,860,246
POWER TAKE-OFF FOR FORD TRUCKS
Filed May 12, 1930  2 Sheets-Sheet 1
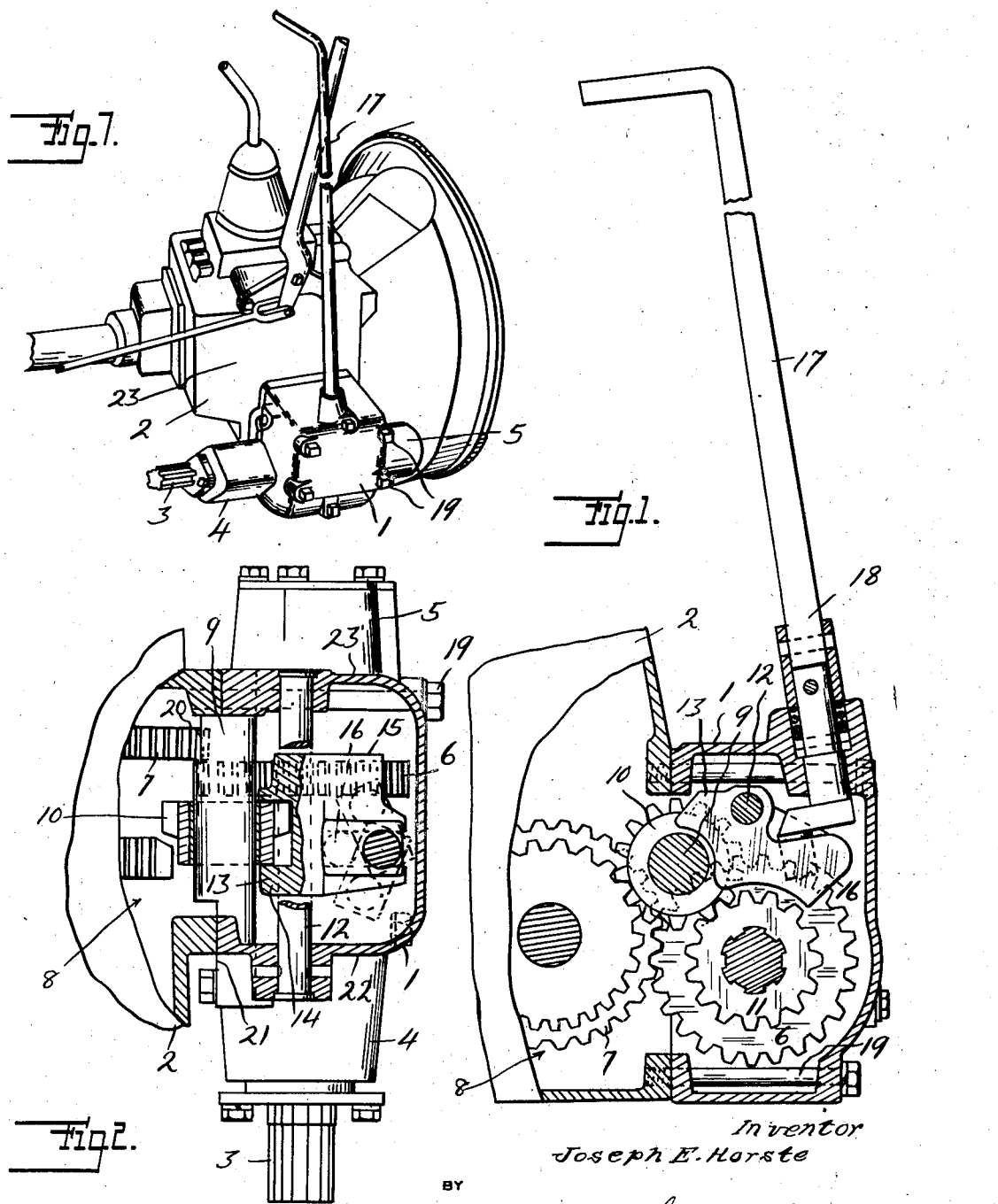
Inventor
Joseph E. Horste

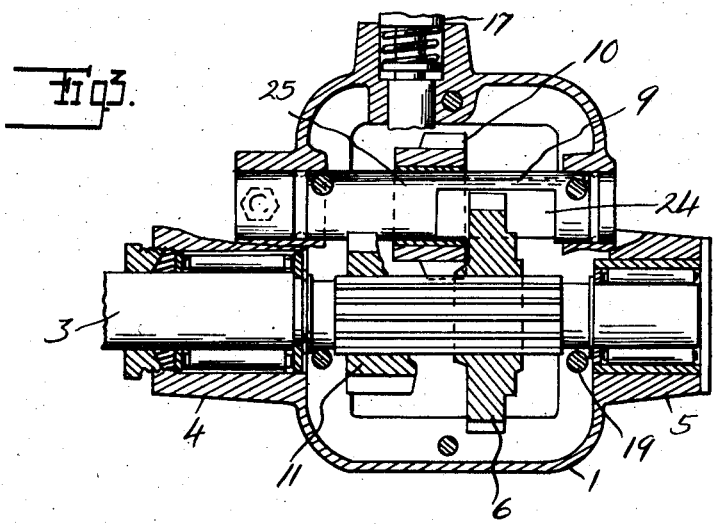
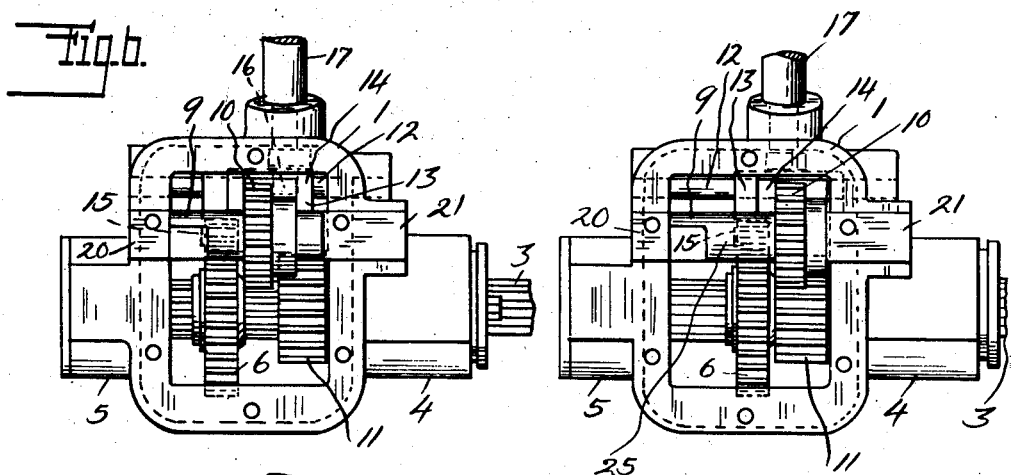
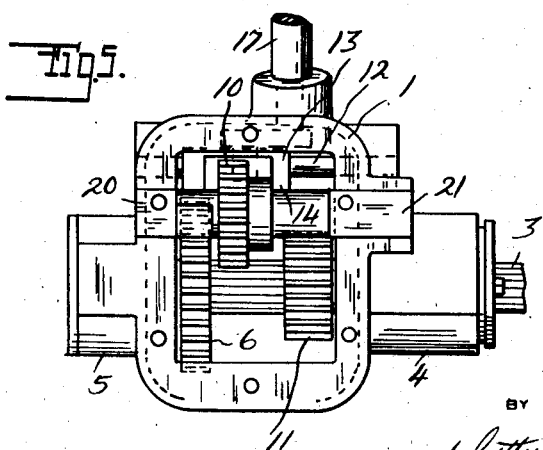

Patented May 24, 1932

1,860,246

UNITED STATES PATENT OFFICE

JOSEPH E. HORSTE, OF DETROIT, MICHIGAN, ASSIGNOR TO DETROIT HARVESTER COMPANY, OF DETROIT, MICHIGAN, A CORPORATION OF MICHIGAN

POWER TAKE OFF FOR FORD TRUCKS

Application filed May 12, 1930. Serial No. 451,781.

This invention relates generally to power take-off devices and refers more particularly to a two-speed power take-off attachment for trucks and the like.

One of the essential objects of the invention is to provide a simple and efficient device of this type in which a power take-off shaft gear and an idler gear are adapted to mesh successively with a counter-shaft gear of the truck transmission and are adapted to be shifted simultaneously by a single shifter element so that one or the other will be in engagement with the counter-shaft gear or both will be disengaged therefrom.

Another object is to provide a shifter element that is self-aligning and that cannot jamb or get caught.

Another object is to provide an idler gear shaft that has a cylindrical portion for supporting the idler gear when in use and that has a segmental portion providing clearance for the drive gear and adapted to support the idler gear when not in use.

Another object is to provide a device in which the idler gear is stationary when not in use.

Another object is to provide an idler gear that may be easily and quickly shifted and that is arranged so as to minimize the load on the bearings.

Another object is to provide a construction wherein the shaft for the idler gear is provided at its opposite ends with segmental portions that have flat surfaces substantially flush with the edges of the casing of the attachment so that the latter may be secured tightly and snugly to the transmission housing of the truck, and that have holes therein that receive the casing securing means, whereby such securing means also serve to hold the shaft stationary.

Many other objects, advantages, and novel details of construction of this invention will be made more apparent as this description proceeds, especially when considered in connection with the accompanying drawings, wherein:

Figure 1 is a fragmentary elevation of a truck transmission with an attachment embodying my invention applied thereto;

Figure 2 is a horizontal sectional view through the attachment;

Figure 3 is a vertical sectional view through the attachment;

Figure 4 is an elevation of the attachment and showing the idler gear in operative position;

Figure 5 is a view similar to Figure 4 and showing the power take-off shaft gear in operative position;

Figure 6 is a view similar to Figure 5 but showing both the idler gear and the power take-off shaft gear in neutral position;

Figure 7 is a perspective view of the device attached to the transmission.

Referring now to the drawings, 1 is a casing adapted to be bolted to the transmission housing 2 of a truck; 3 is a power take-off shaft journaled in lateral projections 4 and 5 of the casing; 6 is a gear splined upon the power take-off shaft and adapted to mesh with and be driven by the counter-shaft gear 7 of the transmission 8 in the housing 2; 9 is a stationary shaft in the casing; 10 is an idler gear movable longitudinally of the shaft 9 and adapted to mesh with and be driven by the counter-shaft gear 7; 11 is a gear rigid with the power take-off shaft and adapted to be driven by the idler gear 10 when the latter is in mesh with the counter-shaft gear 7; 12 is a stationary shaft in the casing; 13 is a shifter element slidable on the shaft 12 and having U-shaped portions 14 and 15 respectively embracing the gears 10 and 6 so that both gears may be moved in unison transversely of the casing to and from engagement with the counter-shaft gear 7; 16 is a crank for moving the shifter 13 longitudinally of the shaft 12; and 17 is an operating handle having the shank 18 connected to the crank 16.

As shown, the casing 1 is secured to the housing 2 by relatively long bolts 19. The shaft 9 has segmental portions 20 and 21 respectively at opposite ends thereof held in opposite walls 22 and 23 respectively of the casing by two of the bolts 19 and is provided intermediate its ends with a segmental portion 24 that provides clearance for the gear 6. In fact, the arrangement is such that when the idler gear 10 is in mesh with the gears 7 and 11, it is upon the cylindrical portion 25 of the shaft 9 but when it is disengaged from the gears 7 and 11 it is stationary upon the intermediate segmental portion 24 of the shaft.

In use when the gear 6 is adjacent the side wall 23 of the casing it is in mesh with the gear 7 of the truck transmission and the power take-off shaft 3 is then revolving in the same direction as the truck crank shaft (not shown) and the idler gear 10 is inactive. When the idler gear 10 is shifted to the left into engagement with the gears 7 and 11, the gear 6 is then inactive and the power take-off shaft 3 is in reverse. When both gears 6 and 10 respectively are in an intermediate neutral position, both are disengaged from the gear 7 and are inactive. The operating handle 17 may be readily rotated to cause the shifter element 13 to position the gears 6 and 10 in any of the three positions just described.

Thus an extremely compact and efficient attachment has been provided and may be easily and quickly applied to or removed from the transmission housing of a truck.

While it is believed that from the foregoing description the nature and advantages of the invention will be readily apparent, I desire to have it understood that I do not limit myself to what is herein shown and described and that such changes may be resorted to when desired as fall within the scope of what is claimed.

What I claim as my invention is:

1. A power take-off attachment for trucks having a transmission housing, and a transmission in the housing including a counter-shaft gear, comprising a casing attachable to the housing, a power take-off shaft carried by the casing, and means associated with the casing adapted to successively transmit motion from said gear direct or in reverse to said power take-off shaft, including a shiftable gear splined upon said power take-off shaft and engageable directly with the gear aforesaid, a second gear on said power take-off shaft, and a shiftable idler gear engageable successively with the countershaft gear and said last mentioned gear.

2. A power take-off attachment for trucks having a transmission housing, and a transmission in the housing including a counter-shaft gear, comprising a casing attachable to the housing, a power take-off shaft carried by the casing, and means associated with the casing adapted to successively transmit motion from said gear direct or in reverse to said power take-off shaft, including two gears successively engageable with the gear aforesaid, and a single element for shifting both gears simultaneously so that one or the other will be in mesh with the counter-shaft gear, or both gears will be disengaged from said counter-shaft gear.

3. A power take-off attachment for trucks having a transmission housing, and a transmission in the housing including a counter-shaft gear, comprising a casing attachable to the housing, a power take-off shaft carried by the casing, and means associated with the casing adapted to successively transmit motion from said gear direct or in reverse to said power take-off shaft, including two gears on the power take-off shaft and an idler gear, two of the last mentioned gears being successively engageable with the counter-shaft gear, one of the two mentioned gears being engageable with the third gear and with the counter-shaft gear, and means for shifting simultaneously the gears engageable with the counter-shaft gear whereby one or the other will be in mesh with said counter-shaft gear, or both will be disengaged therefrom.

4. A power take-off attachment for trucks having a transmission housing, and a transmission in the housing including a counter-shaft gear, comprising a casing attachable to the housing, a power take-off shaft carried by the casing, and means associated with the casing adapted to successively transmit motion from said gear direct or in reverse to said power take-off shaft, including a gear upon the power take-off shaft engageable with the counter-shaft gear aforesaid, a second gear on the power take-off shaft, a stationary shaft carried by the casing, and an idler gear movable longitudinally of said stationary shaft and engageable simultaneously with the counter-shaft gear and the second gear aforesaid when the first mentioned gear is disengaged from the counter-shaft gear.

5. A power take-off attachment for trucks having a transmission housing, and a transmission in the housing including a counter-shaft gear, comprising a casing attachable to the housing, and a stationary shaft having segmental portions in certain walls of the casing with the flat faces of the segments substantially flush with the edges of the casing whereby the latter may be secured directly to the housing aforesaid.

6. A power take-off attachment for trucks having a transmission housing, and a transmission in the housing including a counter-shaft gear, comprising a casing attachable to the housing, a shaft carried by the casing, and a common means for securing the casing to the housing and for holding the shaft stationary in the casing.

7. A power take-off attachment for trucks having a transmission housing, and a transmission in the housing including a counter-shaft gear, comprising a casing attachable to the housing, a power take-off shaft carried by the casing, and means in the casing for transmitting motion from the counter-shaft gear to said shaft including a gear on the shaft, a second gear on the shaft, an idler gear engageable with the second gear, and a shaft for the idler gear having a portion cut away to provide clearance for one of the gears on the power take-off shaft.

8. A power take-off attachment for trucks having a transmission housing, and a transmission in the housing including a countershaft gear, comprising a casing attachable to the housing, a power take-off shaft carried by the casing, and means in the casing for transmitting motion from the counter-shaft gear to said shaft including a gear on the shaft, a second gear on the shaft, an idler gear engageable with the second gear, and a shaft for the idler gear provided at its opposite ends with segmental portions that are received in and are rigid with certain walls of the casing and provided intermediate its ends with a segmental portion that provides clearance for one of the gears aforesaid and that is adapted to support the idler gear when the latter is idle.

9. A power take-off attachment for trucks having a transmission housing, and a transmission in the housing including a countershaft gear, comprising a casing attachable to the housing, a power take-off shaft carried by the casing, and means in the casing for transmitting motion from the counter-shaft gear to said shaft including a gear on the shaft, a second gear on the shaft, an idler gear engageable with the second gear, and a shaft for the idler gear rigid with the casing and having a cylindrical portion and a segmental portion respectively adapted to successively support the idler gear when it is in mesh with the second gear and when it is idle.

10. A power take-off attachment for trucks having a transmission housing, and a transmission in the housing including a countershaft gear, comprising a casing attachable to the housing, a power take-off shaft carried by the casing, and means in the casing for transmitting motion from the counter-shaft gear to the power take-off shaft including two gears successively engageable with the counter-shaft gear, a shifter element movable relative to the casing and adapted to shift both gears simultaneously, and an operating member for the shifter element.

11. A power take-off attachment for trucks having a transmission housing, and a transmission in the housing including a countershaft gear, comprising a casing attachable to the housing, a power take-off shaft carried by the casing, a stationary shaft carried by the casing, and means adapted to transmit motion from said counter-shaft gear direct or in reverse to said power take-off shaft, including a gear rigid with the power take-off shaft, and two gears carried respectively by said stationary and power take-off shafts and successively engageable with the countershaft gear, the gear on the stationary shaft being also engageable with the gear rigid with the power take-off shaft.

12. A power take-off attachment for trucks having a transmission housing, and a transmission in the housing including a countershaft gear, comprising a casing attachable to the housing, two shafts carried by the casing, one being a power take-off, shiftable gears on said shafts, one on each shaft, and each adapted to mesh with the gear aforesaid, and a second gear on said power take-off shaft adapted to be driven by one of the shiftable gears when the said shiftable gear is in mesh with the counter-shaft gear.

13. A power take-off attachment for trucks having a transmission housing, and a transmission in the housing including a countershaft gear, comprising a casing attachable to the housing, two shafts carried by the casing, one being a power take-off, and means associated with the casing adapted to successively transmit motion from said gear direct or in reverse to said power take-off shaft, including a gear on one of the shafts aforesaid, and two shiftable gears successively engageable with the counter-shaft gear, one of said gears being engageable simultaneously with the counter-shaft gear and the gear aforesaid on one of the shafts.

14. A power take-off attachment for trucks having a transmission housing, and a transmission in the housing including a countershaft gear, comprising a casing attachable to the housing, two shafts carried by the casing, one being a power take-off, shiftable gears on said shafts, one on each shaft, and each adapted to mesh with the gear aforesaid, one being idle when the other is in mesh with the counter-shaft gear.

15. A power take-off attachment for motor vehicles having a transmission housing, and a transmission in the housing including a counter-shaft gear, comprising a casing attachable to the housing, two shafts in the casing, one being a power take-off, gears on said shafts, one on each shaft and shiftable in unison lengthwise of said shafts whereby one will be in mesh with the counter-shaft gear and the other will be idle.

In testimony whereof I affix my signature.

JOSEPH E. HORSTE.